United States Patent
Fang et al.

(10) Patent No.: US 10,615,858 B2
(45) Date of Patent: Apr. 7, 2020

(54) COMMUNICATION SYSTEM AND OPERATING METHOD THEREOF

(71) Applicant: INDUSTRIAL TECHNOLOGY RESEARCH INSTITUTE, Chutung, Hsinchu (TW)

(72) Inventors: Shih-Hao Fang, Zhubei (TW); Jen-Yuan Hsu, Jincheng Township, Kinmen County (TW); Chih-Yu Chen, Yilan (TW); Hsien-Wen Chang, Hsinchu (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 0 days.

(21) Appl. No.: 16/185,789

(22) Filed: Nov. 9, 2018

(65) Prior Publication Data

US 2019/0372634 A1 Dec. 5, 2019

(30) Foreign Application Priority Data

May 30, 2018 (TW) .............................. 107118541 A

(51) Int. Cl.
*H04B 7/02* (2018.01)
*H04B 7/06* (2006.01)
*H04B 7/08* (2006.01)
*H04L 12/24* (2006.01)

(52) U.S. Cl.
CPC ......... *H04B 7/0602* (2013.01); *H04B 7/0617* (2013.01); *H04L 41/0823* (2013.01)

(58) Field of Classification Search
CPC . H04B 7/0602; H04B 7/0617; H04L 41/0823; H01Q 3/00
See application file for complete search history.

(56) References Cited

U.S. PATENT DOCUMENTS 7,072,692 B1 * 7/2006 Katz .................... H04B 7/0608
455/442
7,457,641 B1 * 11/2008 Legnain ............ H04W 72/1231
455/450
(Continued)

FOREIGN PATENT DOCUMENTS

CN 105098382 A 11/2015
TW 200520311 A 6/2005
(Continued)

OTHER PUBLICATIONS

U.S. Appl. No. 15/853,554, filed Dec. 22, 2017.
(Continued)

*Primary Examiner* — Tesfaldet Bocure
(74) *Attorney, Agent, or Firm* — Muncy, Geissler, Olds & Lowe, P.C.

(57) ABSTRACT

A communication system and operating method thereof are provided. The communication system includes an intelligent antenna unit which includes a plurality of antennas, an antenna selecting unit, one or more signal processing units and a control unit. The control unit is configured to: set one or more antenna-sectors from the antennas, each of the antenna-sectors includes one or more antennas selected from the antennas. And set a plurality of antenna-sector configurations, each of the antenna-sector configurations includes one or more sectors configured to the signal processing units, wherein the sectors are selected from the antenna-sectors. The control unit selects one of the antenna-sector configurations to operate communication transmission of a user equipment, and each signal processing unit configured to each sector of the selected antenna-sector configuration operating beam sweeping based on a number of antenna beam deployed to the configured each sector.

20 Claims, 5 Drawing Sheets

(56) References Cited

U.S. PATENT DOCUMENTS

| | | | |
|---|---|---|---|
| 7,643,794 B2 | 1/2010 | Ofek et al. | |
| 7,877,113 B2 | 1/2011 | Kish et al. | |
| 9,337,973 B2 | 5/2016 | Hou et al. | |
| 9,479,241 B2* | 10/2016 | Pabla | H01Q 1/48 |
| 2006/0030365 A1 | 2/2006 | Hovers et al. | |
| 2007/0093271 A1 | 4/2007 | Hovers et al. | |
| 2014/0009338 A1* | 1/2014 | Lin | H01Q 3/247 |
| | | | 342/374 |
| 2016/0337881 A1 | 11/2016 | Zhang et al. | |
| 2017/0208613 A1 | 7/2017 | Nam et al. | |

FOREIGN PATENT DOCUMENTS

| | | |
|---|---|---|
| TW | 201129032 A | 8/2011 |
| WO | WO-2016/138934 A1 | 9/2016 |

OTHER PUBLICATIONS

U.S. Appl. No. 15/857,082, filed Dec. 28, 2017.

"Wifi-Calling Goes Mainstream," Ruckus, www.ruckuswireless.com, Dec. 2014, pp. 1-4, Ruckus Wireless.

Yutao Zhu, Zhimin Zeng, T. Zhang and L. Xiao, "Transmission mode selection for energy saving in the CoMP system with semi-smart antenna," 2012 *International Symposium on Communications and Information Technologies (ISCIT)*, Gold Coast, QLD, 2012, pp. 855-860.

A. U. Bhobe and P. L. Perini, "An overview of smart antenna technology for wireless communication," 2001 *IEEE Aerospace Conference Proceedings* (Cat. No. 01TH8542), Big Sky, MT, USA, 2001, pp. 2/875-2/883 vol. 2.

S. Das, "Smart antenna design for wireless communication using adaptive beam-forming approach," *TENCON 2008-2008 IEEE Region 10 Conference*, Hyderabad, 2008, pp. 1-5.

M. Rezk, W. Kim, Z. Yun and M. F. Iskander, "Performance comparison of a novel hybrid smart antenna system versus the fully adaptive and switched beam antenna arrays," in *IEEE Antennas and Wireless Propagation Letters*, vol. 4, pp. 285-288, 2005.

I. Nicolaescu and D. Stoica, "Smart antennas for wireless communications systems," 2010 *Conference Proceedings ICECom, 20th International Conference on Applied Electromagnetics and Communications*, Dubrovnik, 2010, pp. 1-4.

Y. Inoue and K. Cho, "New smart antenna algorithm applied to autonomous area control for mobile radio network," 2009 *3rd European Conference on Antennas and Propagation*, Berlin, 2009, pp. 2050-2054.

* cited by examiner

COMMUNICATION SYSTEM AND OPERATING METHOD THEREOF

This application claims the benefit of Taiwan application Serial No. 107118541, filed May 30, 2018, the disclosure of which is incorporated by reference herein in its entirety.

TECHNICAL FIELD

The disclosure relates in general to a communication system and an operating method thereof.

BACKGROUND

Traditionally the smart antenna technology has been applied on the WiFi system to improve the signal transmission quality. A smart antenna system is formed mainly by multiple directional antennas which directing to different directions. For user equipments located at different directions, base stations having smart antenna system could adjust transmission direction of the antennas efficiently via information feedback from the user equipments, and maximize the user equipment's transmission efficiency to increase overall data transmitting rate of the system. However, the base station need to use multiple sets of the smart antenna system to maintain the service area efficiency, when the density of the user equipment is increasing or the communication amount is increasing.

Further, in general a smart antenna system uses a single antenna pattern for transmission. Even when the antenna system is applied in a multiple base stations coordination system, each of the base stations also selects a single antenna pattern form by one or more antennas for signal transmission. And the antenna patterns form by the other antennas are at the off state, it is less effective in improving signal diversity. It is considered to be one of the research topics to conceive a communication transmission mechanism, which can be applied to an environmental block having different user equipment distribution densities to process the demands of requiring different transmission resources due to the changes of the user equipment distribution densities in the environmental block.

SUMMARY

The disclosure is directed to a communication system and an operating method thereof.

According to one embodiment, an operating method of a communication system is provided. The communication system is used for one or more user equipments for communication. The operating method includes at least the following steps. Setting a plurality of antennas of an intelligent antenna unit into one or more antenna-sectors, each antenna-sector includes one or more antennas selecting from the plurality of antennas. Setting a plurality of antenna-sector configurations, each of the antenna-sector configurations includes one or more sectors configured to one or more signal processing units, wherein the one or more sectors are selected from the one or more antenna-sectors. And selecting one of the plurality of antenna-sector configurations to operate communication transmission of one of the user equipments, wherein each signal processing unit configured to each sector in the selected antenna-sector configuration, operating beam sweeping based on a number of antenna beams deployed to the configured each sectors.

According to another embodiment, a communication system is provided. The communication system is used for one or more user equipments for communication. The operating system includes the following. An intelligent antenna unit, electrically connecting to a plurality of antennas; an antenna selecting unit, electrically connecting to the intelligent antenna unit, the antenna selection unit selecting antenna(s) from the plurality of antennas. One or more signal processing units electrically connecting to the intelligent antenna unit and the antenna selecting unit, each of the signal processing units includes at least one processor and at least one storing device. The operating system further includes a control unit electrically connecting to the antenna selecting unit and the signal processing units, the control unit is configured to operate the following. Set the plurality of antennas into one or more antenna-sectors, each antenna-sector includes one or more antennas selected form the plurality of antennas. Set a plurality of antenna-sector configurations, each of the antenna-sector configurations includes one or more sectors configured to one or more signal processing units, wherein the one or more sectors are selected from the one or more antenna-sectors. And select one of the plurality of antenna-sector configurations to operate communication transmission of one of the user equipments, wherein each signal processing unit configured to each sector in the selected antenna-sector configuration, operating beam sweeping based on a number of antenna beams deployed to the configured each sector.

Figure 1:
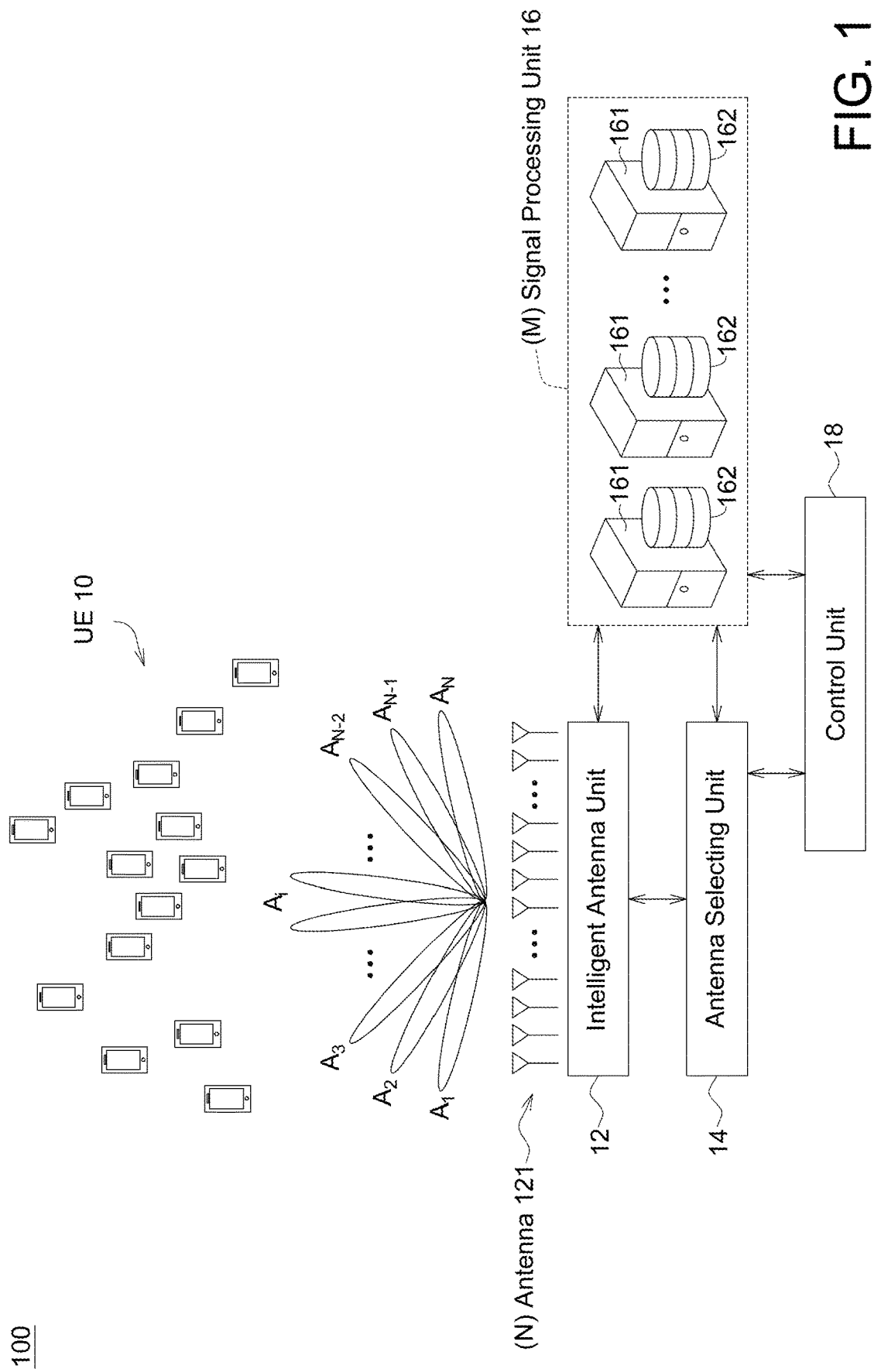
FIG. 1 shows an embodiment of a communication system in accordance with the disclosure.

In the following detailed description, for purposes of explanation, numerous specific details are set forth in order to provide a thorough understanding of the disclosed embodiments. It will be understood, however, that one or more embodiments may be practiced without these specific details. In other instances, well-known structures and devices are schematically shown in order to simplify the drawing.

DETAILED DESCRIPTION

Please refer to FIG. 1, which shows an embodiment of a communication system in accordance with the disclosure. The communication system 100 includes one or more user equipments 10, an intelligent antenna unit 12 which electrically connects multiple antenna 121, an antenna selecting unit 14, one or more signal processing units 16 and a control unit 18. The user equipments 10, for example, may be, but not limited to, a smart phone, a personal computer, a laptop, a vehicle computer, a smart TV, a robot or a smart appliance which can perform wireless communication. The intelligent antenna unit 12 electrically connects to a plurality of antennas 121 to operate wireless transmission. The antennas 121 are directional. For ease of illustration, the directions of the antennas in the drawing of the disclosure is not intended to limit possible implementations. Directions of the antennas 121 of the intelligent antenna unit 12 may be deployed according to the system requirements during implementation. Antenna selecting unit 14 electrically connects to the intelligent antenna unit 12 for select antenna(s) from the plurality of antennas 121. One or more signal processing units 16 electrically connect to the intelligent antenna unit 12 and antenna selecting unit 14, each of the signal processing units 16 includes at least one processor 161 and at least one storing device 162. The control unit 18 electrically connect to the antenna selecting unit 14 and the one or more signal processing units 16.

In the FIG. 1 embodiment, the number of the antennas 121 ($A_1$, $A_2$, $A_3$, ..., $A_i$, ..., $A_{N-2}$, $A_{N-1}$, $A_N$) in the communication system 100 is N, and the number of the signal processing units 16 may be from 1 to M, wherein the N and M are integers. The antenna selecting unit 14 may select one or more antenna-sector configurations $I_i$ which configured by one or more antennas for forming beams with different beam widths and different transmission angles to operate communication transmission for one of the one or more user equipments 10. In general, a wide beam formed by multiple antennas has a shorter service range and is therefore more suitable for user equipment(s) at close distance; a narrow beam formed by a single antenna has a longer service range, and is therefore suitable for use when the user equipment(s) is/are far away from the base station. In an embodiment, it may further group the configured antenna-sector configurations $I_i$ into multiple antenna-sector configuration sets for dynamic selection. The antenna selecting unit 14 and the control unit 18 may be, for example but not limited to, a chip, a circuit, a circuit board, a programmable logical array, a firmware includes instructions/codes or a non-transitory computer-readable media includes instructions/codes.

In an embodiment, the control unit 18 may be configured to set the multiple antennas 121 into one or more antenna-sectors $S_i$, each of the one or more antenna-sectors $S_i$ includes one or more antennas 121 selecting from the plurality of antennas 121 through the antenna selecting unit 14. Wherein the one or more antennas 121 of each antenna-sector $S_i$ may form one or more antenna-sector configurations $I_i$.

In an embodiment, the control unit 18 may further configured to set multiple antenna-sector configurations $I_i$, each of the antenna-sector configurations $I_i$ includes one or more sectors $S_j$ be configured to the one or more signal processing units 16, wherein the one or more sectors $S_j$ in each antenna-sector configuration $I_i$ is selected from the one or more antenna-sector $S_i$. And the embodiment may further select one of the antenna-sector configuration $I_i$ to operate the communication transmission of the user equipments 10. Each signal processing unit 16 configured to each sector $S_i$ in the selected antenna-sector configuration $I_i$, operating beam sweeping based on a number of antenna beams deployed to the configured each sector $S_i$.

In the embodiments according to the disclosure, the one or more antennas 121 of each of the one or more sectors $S_j$ in each of the antenna-sector configurations $I_i$ may form one of the following beam: a continuous beam, a discontinuous beam or a partial continuous beam. In the embodiments according to the disclosure, a number of antennas of each of the one or more sectors $S_j$ in the antenna-sector configurations $I_i$ may be one of the following: the number of antennas is the same, the number of antennas is different or the number of antennas is partially different. In the embodiments according to the disclosure, a number of processing units 16 corresponded to each of the one or more sectors $S_j$ in each of the antenna-sector configurations $I_i$ may be one of the following: the number of processing units is the same, the number of processing units is different or the number of processing units is partially different.

Figure 2A:
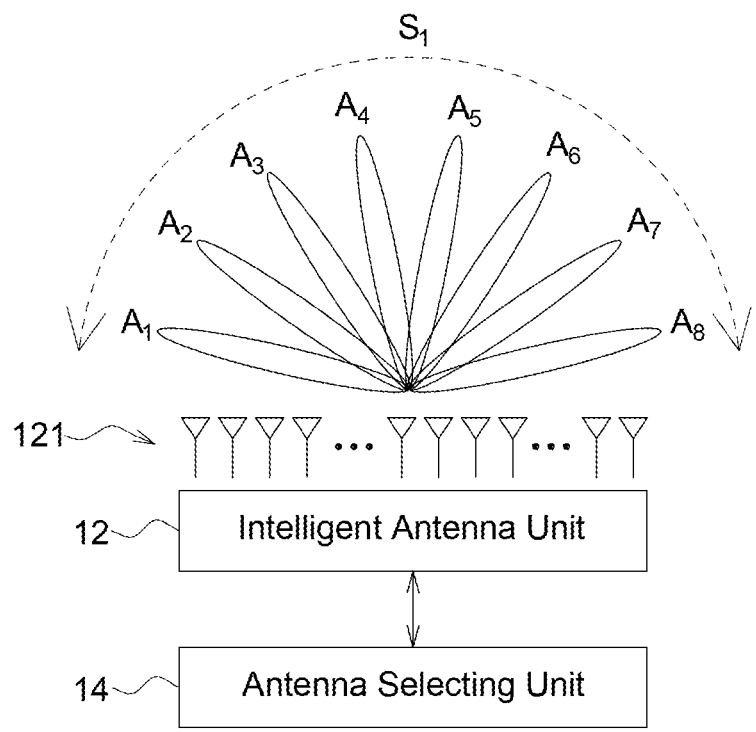
FIGS. 2a, 2b, 2c and 2d show embodiments of setting different antenna-sector configurations in accordance with the disclosure.
Figure 2B:
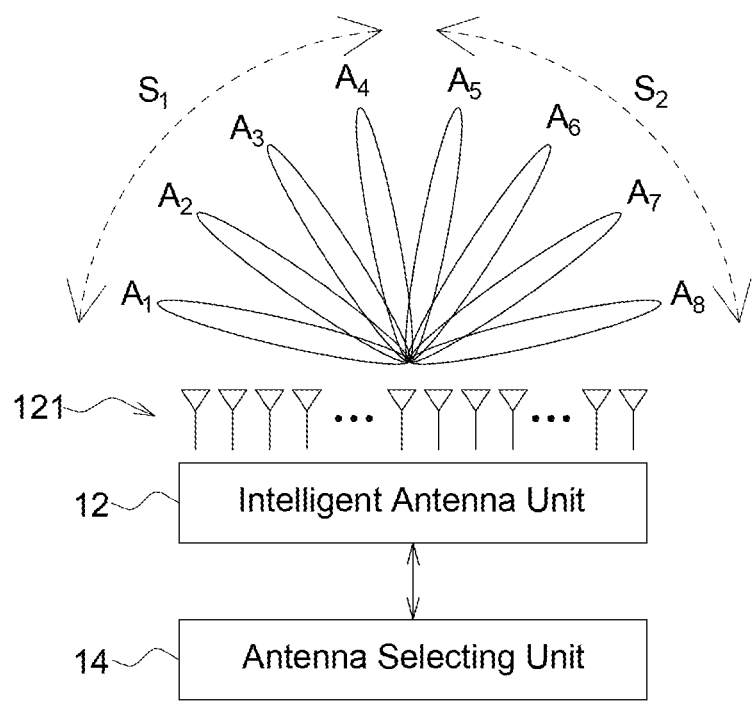
Figure 2C:
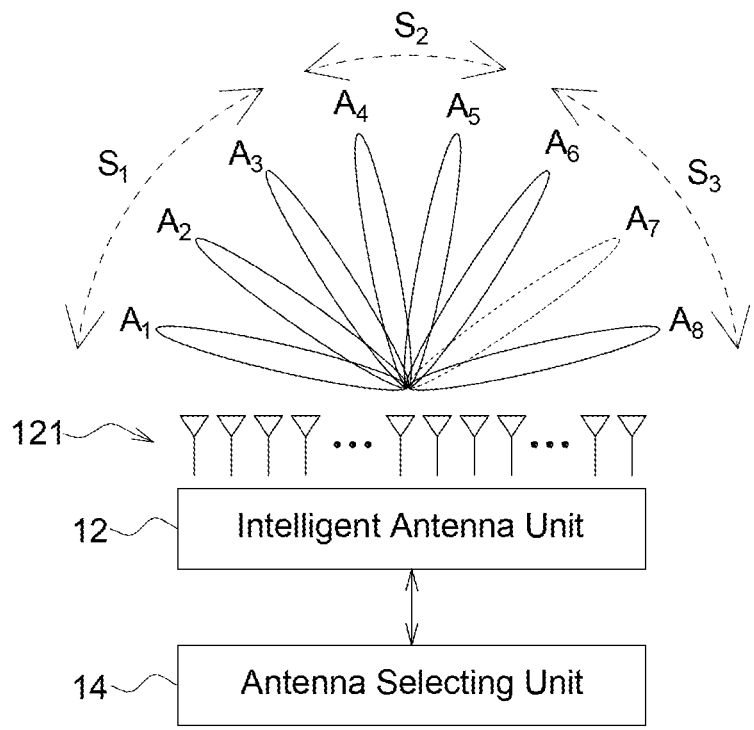
Figure 2D:
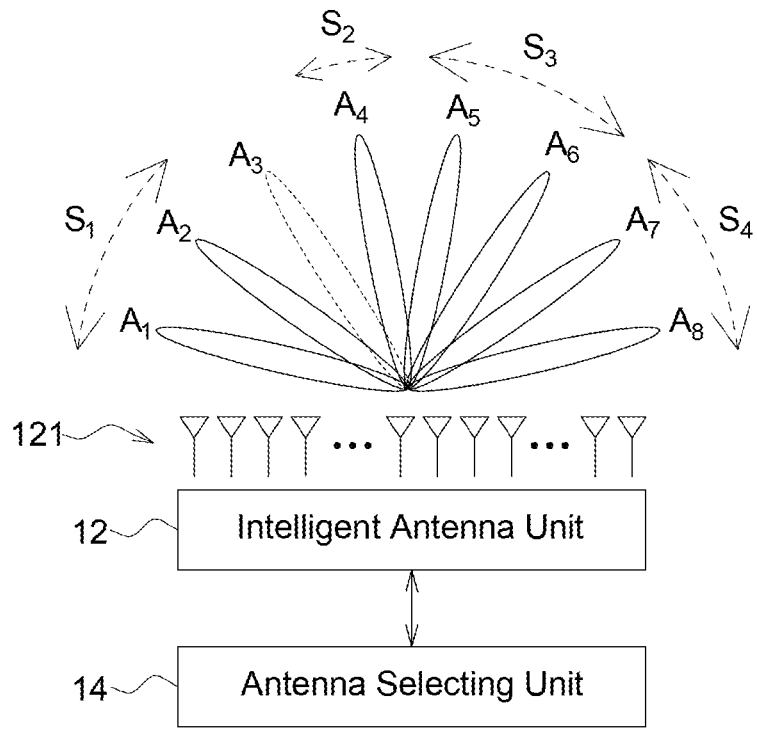

Please refer to FIG. 2a, 2b, 2c, and FIG. 2d which respectively show embodiments of setting different antenna-sector configurations in accordance with the disclosure. In the drawing the antenna number of these embodiments is 8, but the disclosure may not be limited to the aforementioned implementations. In the embodiment of FIG. 2a, all antennas is set into a single antenna-sector, antenna-sector configuration $I_1$ includes one sector $S_1$. In the embodiment of FIG. 2b, the antennas is set into two antenna-sectors, antenna-sector configuration $I_2$ includes two sectors $S_1$ and $S_2$. The antennas $A_1$~$A_4$ are in sector $S_1$, and the antennas $A_5$~$A_8$ are in sector $S_2$. And in the embodiment of FIG. 2c, the antennas is set into four antenna-sectors, antenna-sector configuration $I_3$ includes three sectors $S_1$, $S_2$ and $S_3$ selected from the four antenna-sectors. The sector $S_1$ includes antennas $A_1$~$A_3$, the sector $S_2$ includes antennas $A_4$~$A_5$ and the sector $S_3$ includes antennas $A_6$ and $A_8$. In this embodiment the antenna-sector which includes antenna $A_7$ is not configured to the antenna-sector configuration $I_3$. While in the embodiment of FIG. 2d, the antennas is set into five antenna-sectors, antenna-sector configuration $I_4$ includes four sectors $S_1$, $S_2$, $S_3$ and $S_4$ selected from the five antenna-sectors. The sector $S_1$ includes antennas $A_1$~$A_2$, the sector $S_2$ includes antenna $A_4$, the sector $S_3$ includes antennas $A_5$~$A_6$ and the sector $S_4$ includes antennas $A_7$~$A_8$. In this embodiment the antenna-sector which includes antenna $A_3$ is not configured to the antenna-sector configuration $I_4$.

Please refer together to the FIG. 1, the FIG. 2a, 2b, 2c and FIG. 2d embodiments. In one embodiment, one of the sectors $S_j$ in each of the antenna-sector configurations $I_i$ is configured to one or more of the signal processing units 16. Yet in another embodiment, a plurality of the sectors $S_j$ in each of the antenna-sector configurations are configured to one or more of the signal processing units 16. Referring to the following examples. In the embodiment of FIG. 2a, sector $S_1$ of the antenna-sector configuration $I_1$ may be configured to one signal processing 16 or configured to two signal processing units 16. In the embodiment of FIG. 2b, sectors $S_1$, $S_2$ of the antenna-sector configuration $I_2$ may be configured to the same signal processing unit 16 or each configured to a corresponding signal processing unit 16 respectively. And in the embodiment of FIG. 2c, sectors $S_1$, $S_3$ of the antenna-sector configuration $I_3$ may be configured to the same signal processing unit 16 or configured to three signal processing units 16, and sector $S_2$ of the $I_3$ may be configured to two signal processing units 16. While in the embodiment of FIG. 2d, sector $S_1$, $S_2$ of the antenna-sector configuration $I_4$ may be configured to the same signal processing unit 16 or configured to two signal processing units 16, and sector $S_3$ of the $I_4$ may be configured to one signal processing units 16. The deployment is adjustable based on the low, medium or high communication traffic demand, for instance, may have multiple signal processing units 16 service one or more antennas 121, or one signal processing unit 16 services one or more antennas 121.

Figure 3:
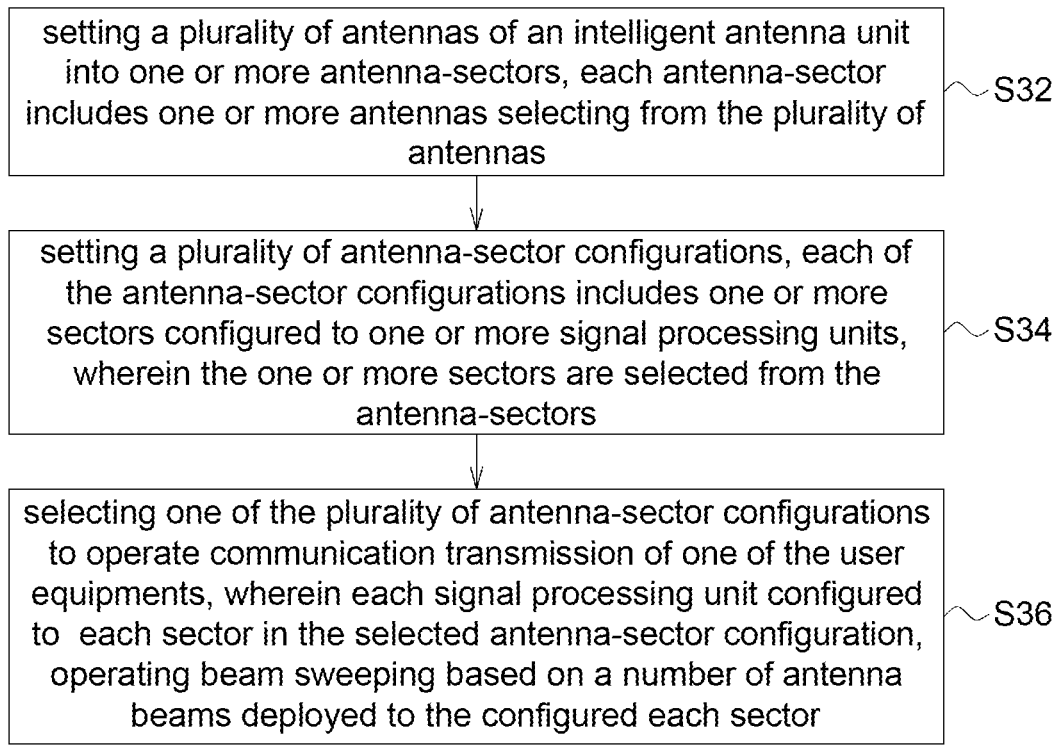
FIG. 3 shows an operation flow embodiment of an operating method of a communication system in accordance with the disclosure.

Please refer to FIG. 3, which shows an operation flow embodiment of an operating method of a communication system 100 in accordance with the disclosure, the communication system 100 is for operating communication of one or more user equipments 10. The operating method of a communication system 100 embodiment includes the steps 332~336.

At step S32, setting a plurality of antennas 121 of an intelligent antenna unit 12 into one or more antenna-sectors $S_i$ by the control unit 18, each antenna-sector $S_i$ includes one or more antennas selecting from the plurality of antennas 121 by the antenna selecting unit 14.

At step S34, setting a plurality of antenna-sector configurations $I_i$ by the control unit 18, each of the antenna-sector configurations $I_i$ includes one or more sectors $S_j$ configured to one or more signal processing units 16, wherein the one or more sectors $S_j$ are selected from the one or more antenna-sectors $S_i$;

And at step S36, selecting one of the plurality of antenna-sector configurations $I_i$ to operate communication transmission of a user equipment 10 by the control unit 18, wherein each signal processing unit 16 configured to each sector $S_j$ in the selected antenna-sector configuration $I_i$, operating beam sweeping based on a number of antenna beams deployed to the configured each sector $S_j$.

Figure 4A:
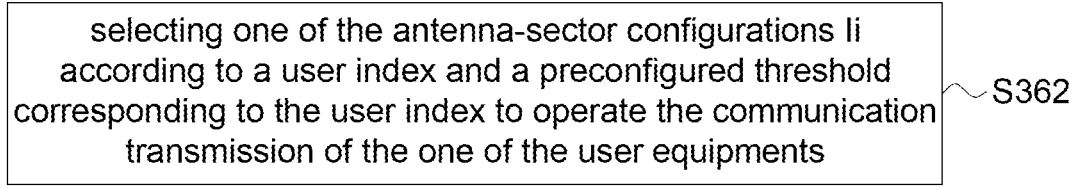
FIGS. 4a and 4b show operation flow embodiments of an operating method of a communication system in accordance with the disclosure.
Figure 4B:
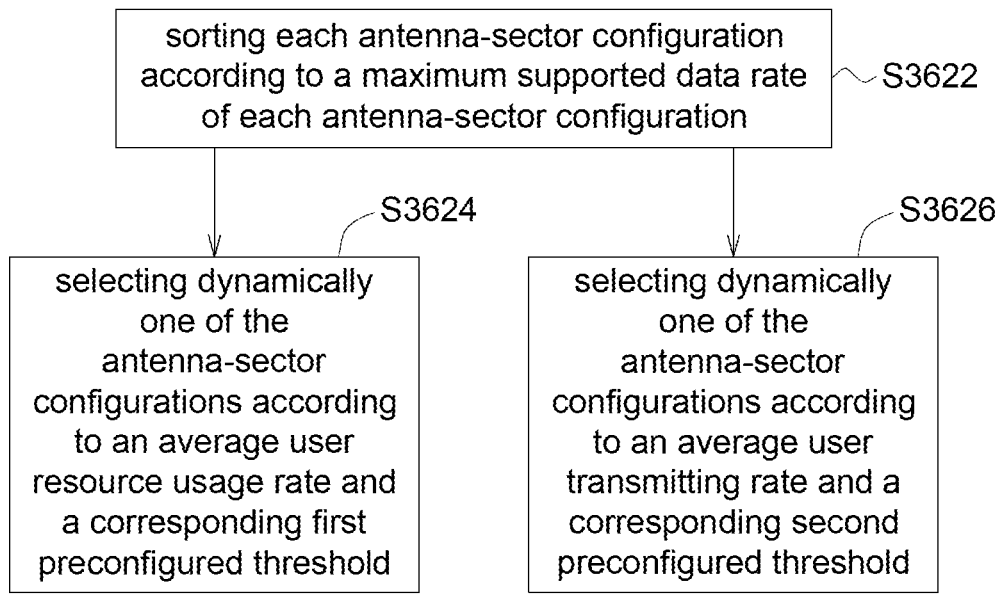

FIGS. 4a and 4b respectively show operation flow embodiments of an operating method of the communication system 100 in accordance with the disclosure. Please refer to FIG. 4a, in an embodiment, the control unit 18 may be configured to select one of the antenna-sector configurations $I_i$ according to a user index and a preconfigured threshold corresponding to the user index to operate the communication transmission of the user equipments 10 (S362).

Please refer together to the FIG. 1, and the FIG. 2a~2d embodiments. For convenience of description, take each sector $S_j$ in each antenna-sector configuration $I_i$ corresponds to one signal processing unit 16 as an example for further explanation. In such deployment scenario, the maximum supported data rate of each sector $S_j$ is $R_s$. Thereupon, the maximum supported data rate of antenna-sector configuration $I_1$ is $R_s$, the maximum supported data rate of antenna-sector configuration $I_2$ is $2R_s$, the maximum supported data rate of antenna-sector configuration $I_3$ is $3R_s$, and the maximum supported data rate of antenna-sector configuration $I_4$ is $4R_s$.

Please refer to embodiment of FIG. 4b, in an embodiment, the user index may be an average user resource usage rate or an average user transmitting rate and the operating method further includes the following embodiments.

At step S3622, sorting each antenna-sector configuration according to a maximum supported data rate of each antenna-sector configuration. In an embodiment at step S3624, selecting dynamically one of the antenna-sector configurations $I_i$ according to the average user resource usage rate and a corresponding first preconfigured threshold. In another embodiment at step S3626, selecting dynamically one of the antenna-sector configurations $I_i$ according to the average user transmitting rate and a corresponding second preconfigured threshold. Wherein the average user resource usage rate and average user transmitting rate may both be calculated from the receiving user information. And within a time duration, may select an antenna-sector configuration $I_i$ to use, according to the calculated the average user resource usage rate or the calculated average user transmitting rate. That is, within a time duration, to use which antenna-sector configuration $I_i$ to perform communication transmission, may be dynamically switched according to the transmission traffic status at that time. In an embodiment, the control unit 18 of the communication system 100 may be configured to operate the aforementioned method embodiments.

In an embodiment, may sorting each antenna-sector configuration $I_i$ from high to low based on the maximum supported data rate of each of the antenna-sector configurations $I_i$. An exemplary algorithm may calculate a user average transmitting rate $D_{avg}$ according to a user information, and decide an i value based on the $D_{avg}$ and a second preconfigured threshold $T_D$, to select an antenna-sector configuration $I_i$ for performing communication transmission. Another exemplary algorithm may calculate a user average resource usage rate $R_{avg}$ according to user information, and decide an i value based on the $R_{avg}$ and a first preconfigured threshold $T_R$. Wherein, if $D_{avg} > T_D$ (or if $R_{avg} > T_D$), then i=i−1 and the smallest value of i is 1. And wherein, if $D_{avg} < T_D$ (or if $R_{avg} < T_D$), then i=i+1 and the largest value of i depends on the number of antenna-sector configurations could be configured in the system. Iteratively performing the algorithm in a set time zone to select an antenna-sector configuration $I_i$ for performing communication transmission according to the i value. According to the aforementioned algorithm, the larger the value of i represents the more sectors formed by the antenna unit. On the other hand, the smaller the value of i, the less sectors formed by the antenna unit.

The embodiments of each kinds of smart antenna system disclosed above could be used in the antenna module of 5G system. Also could be used to replace the antenna array which may cause the possible issues of high antenna complexity, and adoptable for being utilized in the small cell system. The embodiments in accordance with the disclosure may utilize one intelligent antenna unit 12 with scalable signal processing units 16 to deal with different flow requirements of communications.

It will be clearly to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An operating method of a communication system, wherein the communication system is used by one or more user equipments for communication, and the operating method comprises:
   setting a plurality of antennas of an intelligent antenna unit into one or more antenna-sectors, each antenna-sector includes one or more antennas selecting from the plurality of antennas;
   setting a plurality of antenna-sector configurations, each of the antenna-sector configurations includes one or more sectors configured to one or more signal processing units, wherein the one or more sectors are selected from the one or more antenna-sectors; and
   selecting one of the plurality of antenna-sector configurations to operate communication transmission of one of the user equipments, wherein each signal processing unit configured to each sector in the selected antenna-sector configuration, operating beam sweeping based on a number of antenna beams deployed to the configured each sector.

2. The operating method of the communication system according to claim 1, wherein one of the sectors in each of the antenna-sector configurations is configured to one or more of the signal processing units.

3. The operating method of the communication system according to claim 1, wherein a plurality of the sectors in each of the antenna-sector configurations are configured to one or more of the signal processing units.

4. The operating method of the communication system according to claim 1, wherein one or more antennas of each of the sectors in each of the antenna-sector configurations forming one of the following beam: a continuous beam, a discontinuous beam or a partial continuous beam.

5. The operating method of the communication system according to claim 1, wherein a number of antennas of each of the sectors in the antenna-sector configurations is one of the following: the number of antennas is the same, the number of antennas is different or the number of antennas is partially different.

6. The operating method of the communication system according to claim 1, wherein a number of processing units corresponded to each of the sectors in each of the antenna-sector configurations is one of the following: the number of processing units is the same, the number of processing units is different or the number of processing units is partially different.

7. The operating method of a communication system according to claim 1, wherein the one or more antennas of each of the antenna-sectors constitute one or more antenna-sector configurations.

8. The operating method of the communication system according to claim 1, wherein selecting one of the antenna-sector configurations according to a user index and a preconfigured threshold corresponding to the user index to operate the communication transmission of the one of the user equipments.

9. The operating method of the communication system according to claim 8, wherein the user index is an average user resource usage rate, the method further comprises:
sorting each antenna-sector configuration according to a maximum supported data rate of each antenna-sector configuration; and
selecting dynamically one of the antenna-sector configurations according to the average user resource usage rate and a corresponding first preconfigured threshold.

10. The operating method of the communication system according to claim 8, wherein the user index is an average user transmitting rate, the method further comprises:
sorting each antenna-sector configuration according to a maximum supported data rate of each antenna-sector configuration; and
selecting dynamically one of the antenna-sector configurations according to the average user transmitting rate and a corresponding second preconfigured threshold.

11. A communication system used for one or more user equipments for communication, comprising:
an intelligent antenna unit, electrically connects a plurality of antennas;
an antenna selecting unit, electrically connects the intelligent antenna unit, to select antenna(s) from the plurality of antennas;
one or more signal processing units electrically connect the intelligent antenna unit and the antenna selecting unit, each of the signal processing units includes at least one processor and at least one storing device; and
a control unit electrically connects the antenna selecting unit and the signal processing units, the control unit is configured to:
set the plurality of antennas into one or more antenna-sectors, each antenna-sector includes one or more antennas selected form the plurality of antennas;
set a plurality of antenna-sector configurations, each of the antenna-sector configurations includes one or more sectors configured to one or more signal processing units, wherein the one or more sectors are selected from the one or more antenna-sectors; and
select one of the plurality of antenna-sector configurations to operate communication transmission of one of the user equipments, wherein each signal processing unit configured to each sector in the selected antenna-sector configuration, operating beam sweeping based on a number of antenna beams deployed to the configured each sector.

12. The communication system according to claim 11, wherein one of the sectors in each of the antenna-sector configurations is configured to one or more of the signal processing units.

13. The communication system according to claim 11, wherein a plurality of the sectors in each of the antenna-sector configurations are configured to one or more of the signal processing units.

14. The communication system according to claim 11, wherein one or more antennas of each of the sectors in each of the antenna-sector configurations forming one of the following beam: a continuous beam, a discontinuous beam or a partial continuous beam.

15. The communication system according to claim 11, wherein a number of antennas of each of the sectors in the antenna-sector configurations is one of the following: the number of antennas is the same, the number of antennas is different or the number of antennas is partially different.

16. The communication system according to claim 11, wherein a number of processing units corresponded to each of the sectors in each of the antenna-sector configurations is one of the following: the number of processing units is the same, the number of processing units is different or the number of processing units is partially different.

17. The communication system according to claim 11, wherein the one or more antennas of each of the antenna-sectors constitute one or more antenna-sector configurations.

18. The communication system according to claim 11, wherein selecting one of the antenna-sector configurations according to a user index and a preconfigured threshold corresponding to the user index to operate the communication transmission of the one of the user equipments.

19. The communication system according to claim 18, wherein the user index is an average user resource usage rate, the control unit further configured to:
sort each antenna-sector configuration according to a maximum supported data rate of each antenna-sector configuration; and
select one of the antenna-sector configurations dynamically according to the average user resource usage rate and a corresponding first preconfigured threshold.

20. The communication system according to claim 18, wherein the user index is an average user transmitting rate, the control unit further configured to:
sort each antenna-sector configuration according to a maximum supported data rate of each antenna-sector configuration; and
select one of the antenna-sector configurations dynamically according to the average user transmitting rate and a corresponding second preconfigured threshold.

* * * * *